United States Patent [19]

Seilly et al.

[11] 4,272,027

[45] Jun. 9, 1981

[54] FUEL INJECTION PUMPING APPARATUS

[75] Inventors: Alec H. Seilly, North Wembley; Dorian F. Mowbray, Burnham, both of England

[73] Assignee: Lucas Industries Limited, Birmingham, England

[21] Appl. No.: 94,717

[22] Filed: Nov. 16, 1979

[30] Foreign Application Priority Data

Mar. 3, 1979 [GB] United Kingdom ............... 07556/79

[51] Int. Cl.³ .............................................. B05B 1/30
[52] U.S. Cl. .................................................. 239/585
[58] Field of Search .................... 239/585, 88, 89, 90, 239/91, 92, 533.1, 533.2, 533.3, 533.4, 533.9; 251/139, 140, 141; 123/32 AE, 32 AB, 139 E

[56] References Cited

U.S. PATENT DOCUMENTS

| 3,831,846 | 8/1974 | Perr et al. | 239/89 |
| 4,116,389 | 9/1978 | Furtah et al. | 239/585 |

Primary Examiner—Robert B. Reeves
Assistant Examiner—Gene A. Church

[57] ABSTRACT

A fuel injection pumping apparatus includes a stepped body with a nozzle head mounted at the narrower end and an electromagnetic actuating means located in the wider end. A pumping plunger is mounted in a bore in a valve mounting having a flange located against the step defined between the wider and narrower portions of the body. The mounting also carries valve element having a head which is spring biased into contact with a seating. The valve element is engaged by the plunger towards the end of its movement to terminate flow of fuel from the nozzle.

12 Claims, 4 Drawing Figures

FUEL INJECTION PUMPING APPARATUS

This invention relates to a fuel injection pumping apparatus for supplying fuel to a combustion space of an internal combustion engine, the apparatus being of the kind comprising an injection nozzle positioned in use on the engine so that fuel delivered to the nozzle will be injected into the combustion space and an injection pump for delivering fuel to the nozzle in timed relationship with the associated engine.

Such apparatus is known for a multi-cylinder engine in which a plurality of pumps are actuated by cams respectively carried by a cam shaft driven by the associated engine. The pumps are usually mounted in a common body and the output of each pump is controlled by a single control member the setting of which is determined by a governor mechanism. The pumps have to be carefully adjusted prior to use to ensure so far as is possible, that each pump delivers the same amount of fuel and at the correct time, for a given setting of the control member, to injection nozzles respectively on the engine. The governor mechanism may take the form of a mechanical governor but this must be carefully constructed to control the setting of the control member and in addition it is usually necessary to provide some form of timing adjusting device in the drive to the cam shaft to provide timing variations in accordance with variations in engine speed. The design and construction of the governor and the timing device is not easy particularly where great accuracy of fuel quantity and timing is required. Moreover the position of the drive from the engine to the cam shaft often presents the engine manufacturer with design problems.

Apparatus has been designed which attempts to overcome at least some of the problems outlined above. For example, it is known to store fuel at high pressure in an accumulator which is either delivered to the engine directly through the nozzles, the nozzles for this purpose employing suitable valves, or the fuel at high pressure is utilized to actuate individual pumps again under the control of valves which may be operated electrically. Such arrangements have the advantage that the control of the aforesaid valves can be effected by electronic control circuits which provide the governing and timing function. In this respect electronic circuits can be designed to provide more accurate control than can be obtained with the mechanical devices. However, it is still necessary to generate the high fuel pressure and the generation of the high fuel pressure is usually achieved by means of an engine driven pump. Moreover, the valves need to be capable of controlling the flow of fuel at high pressure and the design of such valves to ensure that they do not require much power for their operation, is not easy.

The object of the present invention is to provide a fuel injection pumping apparatus in a simple and convenient form.

According to the invention a fuel injection pumping apparatus of the kind specified comprises an elongated hollow body having the injection nozzle mounted at one end thereof, means defining a bore in the body, a plunger forming part of said pump slidable in said bore to vary the size of a pumping chamber, resilient means biasing the plunger in a direction to increase the size of the pumping chamber, electromagnetic means operable to move the plunger against the action of said resilient means to displace fuel from the pumping chamber through said nozzle, and a valve controlled fuel inlet to said pumping chamber and through which fuel can flow into said bore from a source of fuel when the plunger is moved by said resilient means, said valve also acting to relieve the pressure in said bore by its engagement with the plunger, after the plunger has been moved to a predetermined position by the electromagnetic means.

Examples of fuel injection pumping apparatus in accordance with the invention will now be described with reference to the accompanying drawings in which.

Figure 1:
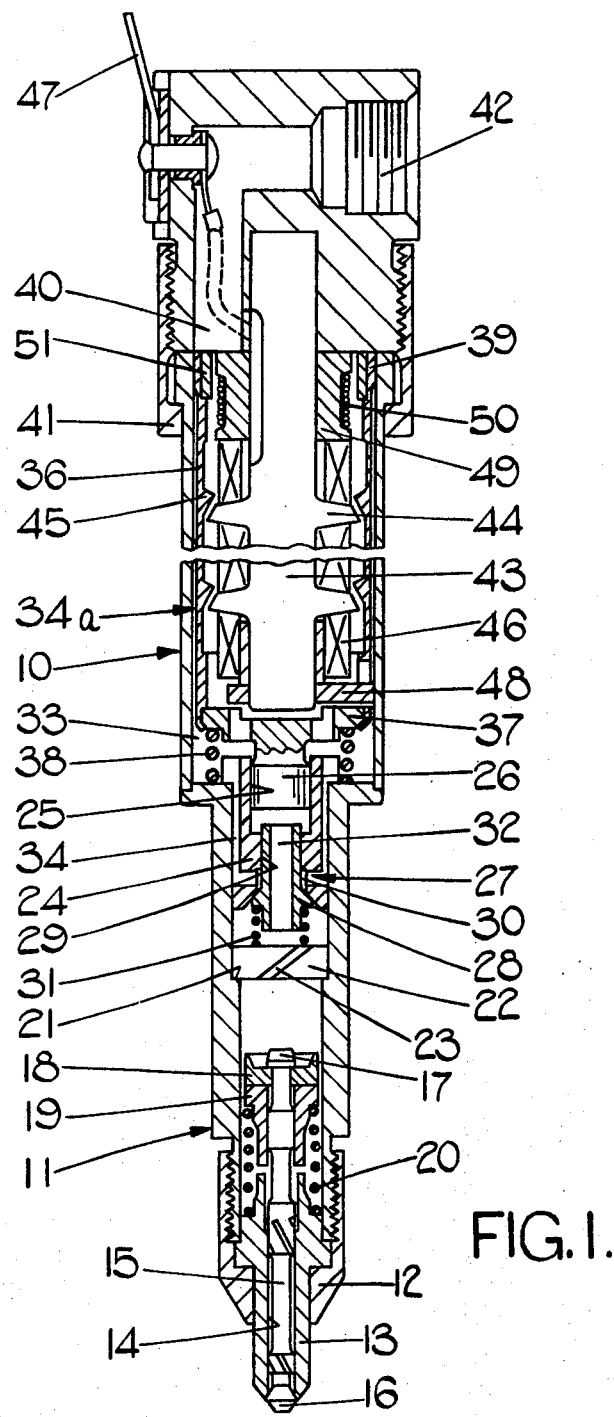
FIG. 1 is a sectional side elevation of one example of the apparatus.

With reference to FIG. 1 of the drawings an internal combustion engine is provided with a plurality of combined fuel pumps and injectors 10 hereinafter called pump/injectors. In use, the pump/injectors are mounted on the engine so that fuel can be injected into the combustion chambers of the engine respectively. Each pump injector 10 comprises a hollow cylindrical stepped body 11 the narrower end of which is screw threaded to receive a retaining nut 12 which retains on the body, a nozzle head 13. The nozzle head 13 has an end portion of conical form in which is defined a seating located at the end of a centrally disposed bore 14. Located within the bore is a valve member 15 which has a head 16 for co-operation with the aforesaid seating. The valve member 15 is guided for movement within the bore 14 by fluted portions integrally formed with the valve member and the diameter of the valve member is such that it can be passed through the bore 14. At its end remote from the head the valve member has a portion 17 against which is located a locking member 18 which has a lateral slot to permit it to be located about a reduced portion of the valve member beneath the portion 17. The locking member retains a spring abutment 19 in position and located between the spring abutment 19 and a portion of the nozzle head is a coiled compression spring 20 which biases the head 16 into contact with the seating.

The body 11 is provided with a central bore into which extends a portion of the nozzle head 13 and the latter is provided with a flange which is held in sealing engagement with the end of the body 11 by the retaining nut 12. Alternatively the flange may be secured by rolling a reduced end portion of the body over the flange or by electron beam welding the flange to the body.

Extending into the bore in the body 11 is a cylindrical flanged valve mounting 24. The mounting 24 is retained in the bore by means not shown and within the mounting there is formed a stepped bore. The wider portion 25 of the bore constitutes a cylinder for a piston 26. The intermediate portion 29 of the bore accommodates a valve element 27 and a slightly enlarged portion 30 of the bore is shaped at its end to define a seating for a valve head 28 forming part of the valve element 27. The valve head 28 is biased into contact with the seating by means of a light coiled compression spring 31 and extending through the valve element is a passage 32. The spring 31 seats against a member 22 which is located against a step 21 in the bore in the body, the member 22 having a peripheral groove or grooves 23 along which fuel can flow. The portion 30 of the bore communicates with a chamber 33 defined in an enlarged portion of the body 11 by way of longitudinal grooves 34 formed in the outer surface of the valve mounting and which are connected by transverse drillings to the aforesaid portion 30 of the bore.

The valve element projects into the aforesaid cylinder and it can be engaged as will be described, by the piston 26.

An electromagnetic means generally indicated at 34a, is located within the chamber 33 for moving the piston 26 in the direction to displace fuel from the cylinder 25. The electro-magnetic means comprises a thin walled armature 36 this being of tubular form and being connected to a plate like part 37 which is integrally formed with the piston 26. The plate like part is provided with apertures extending therethrough to facilitate the flow of fuel and it also serves as an abutment for a coiled compression spring 38 which biases the piston 26 away from the valve element. The armature is guided for movement by the piston 26 and at its other end by an enlargement 39 slidable on the interior surface of the body 11.

The open other end of the body 11 is closed by an end closure 40 which is retained in position by means of a retaining nut 41, this engaging a flange on the body. The end closure defines a fuel inlet 42 which communicates with the chamber 33 and it also supports a stator assembly which comprises a rod 43 formed from magnetizable material. The rod 43 extends within the armature and it is provided with a pair of helical ribs 44. The interior surface of the armature is also provided with helical ribs 45 and the presented surfaces of the ribs 44 and 45 are inclined to the longitudinal axis of the pump/injector. In addition the surfaces are spaced from each other in the de-energised condition (as shown) of the electromagnetic means.

In the two grooves defined between the ribs 44 is located a pair of windings 46. The windings conveniently are formed by winding wire along one groove from one end of the rod and returning along the other groove to the same end of the rod. The windings have a plurality of turns and when electric current is supplied thereto the flow of current in the windings in the two grooves is in the opposite direction so that the ribs 44 assume opposite magnetic plurality. The end connections of the windings are connected to terminal pieces indicated at 47 and mounted on the end closure 40. If desired one end may be connected to the body of the pump/injector in which case only a single connector is required.

The extent of movement of the armature under the action of the spring 38 is limited by the abutment of the armature with the end closure and furthermore, the armature is retained against angular movement by means of a locating member 48 which is secured to the rod at its end adjacent the piston and which extends through an aperture in the armature.

The pump/injector also incorporates a transducer for providing an indication of the position of the armature. The transducer comprises a core member 49 which is located about the rod 43 at the end thereof adjacent the end closure 40. The core member is provided with a circumferential groove in which is located a winding 50 and the armature mounts a ring 51 formed from magnetisable material and which as the armature moves, alters the reluctance of the magnetic circuit formed by the core and ring thereby altering the inductance of the winding 50.

The operation of the pump/injector will now be described assuming that the various parts are in the position shown in the drawing. In this position and as will be explained, the cylinder 25 is completely filled with fuel and the valve head 28 is in contact with its seating. When the windings 46 are supplied with electric current the armature moves downwardly against the action of the spring 38. The fuel in the cylinder is therefore pressurized by the piston 26 and this pressure acts upon the head 16 of the valve member 15. When the pressure is sufficient the head 16 is lifted from its seating against the action of the spring 20 and fuel flows from the nozzle head, the fuel being atomised during its passage past the valve head. The flow of fuel continues until the piston engages with the valve element 27. As soon as the head 28 of the valve element is lifted from its seating against the action of the spring 31, the pressure of fuel in the cylinder falls to that within the chamber 33. There is, therefore, a rapid reduction in the pressure of fuel acting on the valve head 16 and the spring 20 moves the valve head into contact with its seating so that further flow of fuel and in particular unatomised fuel is prevented from leaving the nozzle head. The piston will continue to move downwardly until the part 37 engages with the end of the valve mounting. It has already been mentioned that the presented faces of the ribs 44 and 45 are inclined to the axis of the pump/injector. The purpose of such inclination is to obtain a more linear force/distance characteristic during movement of the armature. The supply of current to the windings may be cut off or reduced before the piston reaches the end of its stroke, the stroke of the piston being completed due to the inertia of the moving parts.

When the winding is de-energised the spring 38 will effect upward movement of the piston and the armature. During such movement it can be expected that the pressure within the cylinder will be lower than that in the chamber 33, and the effect is that the valve head 28 is maintained off its seating by the pressure of fuel in the chamber 33 acting on the valve head. If the maximum volume of fuel is required then the piston is allowed to move its maximum distance under the action of the spring 38 and once movement of the piston has halted and the pressure within the cylinder has become substantially the same as that within the chamber 33, the valve element moves under the action of the spring 31 to the closed position. The pump/injector is then ready for a further delivery of fuel.

If it is required that the pump/injector should delivery less than its maximum volume of fuel then the return motion of the armature under the action of the spring 38 must be halted at some intermediate position. The aforesaid transducer provides a signal indicative of the position of the armature and therefore the piston, and using this signal it is possible to partly energise the windings when the piston has moved by the required amount. Such partial energisation of the windings creates sufficient force to hold the armature against the action of the spring 38 but does not pressurize the fuel in the cylinder by an amount sufficient to effect opening of the valve member 15 in the nozzle head. It will be apparent that the filling of the cylinder can take place at any time after the termination of fuel delivery and before the next delivery of fuel is required. It must be remembered however, that filling of the cylinder does take a finite time and therefore if it is decided to fill immediately before delivery of fuel is required, sufficient time must be allowed for filling to take place.

Figure 2:
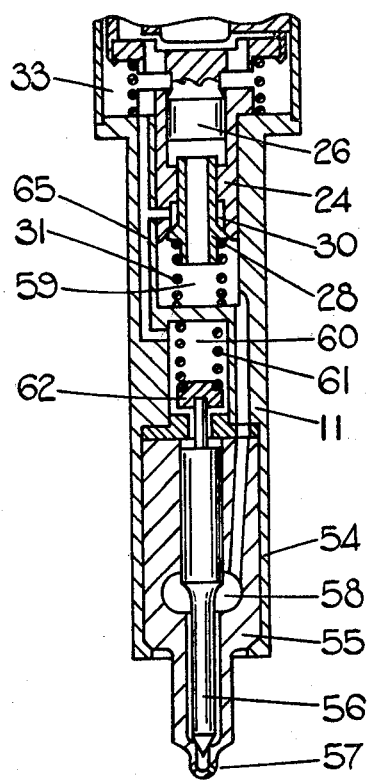
FIGS. 2 and 3 are sectional side elevations showing modifications of a part of the apparatus seen in FIG. 1.

Referring now to FIG. 2 and in which parts which have the same function are provided with the same reference numerals as those parts of FIG. 1.

The pump/injector of FIG. 2 has a different form of nozzle head and in which the valve member opens inwardly as opposed to outwardly as in the example of FIG. 1. In FIG. 2 the nozzle head is indicated at 54 and it comprises a stepped body 55 in which is formed a cylindrical blind bore. The bore at the narrower end of the body defines a seating for engagement by the conical end of a valve member 56. The narrower and projecting portion of the body 55 defines outlet orifices 57 and the flow of fuel through these orifices is controlled by the valve member and takes place when the valve member is lifted from the seating. Formed in the wall of the bore in the body 55 is a circumferential groove 58 and this communicates by way of cooperating passages in the body 55 and also in the body 11, with a chamber 59 which accommodates the spring 31.

A further chamber 60 is provided and this contains a coiled compression spring 61 which is engaged with one end wall of the chamber and has its other end engaging with a spring abutment 62 which itself is located upon a reduced portion of the valve member 56. The chamber 60 communicates with the chamber 33 by way of a passage 63 and a branch passage extends from this passage to the portion 30 of the bore in the valve mounting 24.

In operation, when the piston 26 moves downwardly fuel under pressure acts upon a step defined on the valve member 56 and lifts same against the action of the spring 61. Flow of fuel therefore takes place through the orifices 57 and this flow of fuel continues until the piston 26 lifts the valve head 28 from its seating.

Figure 3:
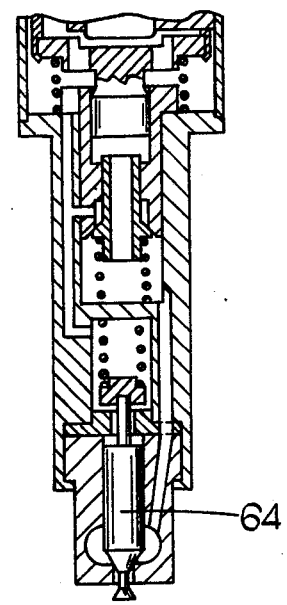

FIG. 2 is only a diagrammatic illustration of the modification and in practice the nozzle head will probably be retained upon the body 11 by means of a retaining nut as in the example of FIG. 1. This also applies to the arrangement shown in FIG. 3 which is essentially the same as the arrangement shown in FIG. 2 with the exception that a different form of nozzle head is provided. In this case the valve member 64 is of the so called "pintle" type which again in the closed position co-operates with a seating but which in the open position, has a reduced portion extending with clearance through a hole disposed at the end of the bore in the nozzle head. When the valve member is lifted fuel flows through the aforesaid clearance.

Figure 4:
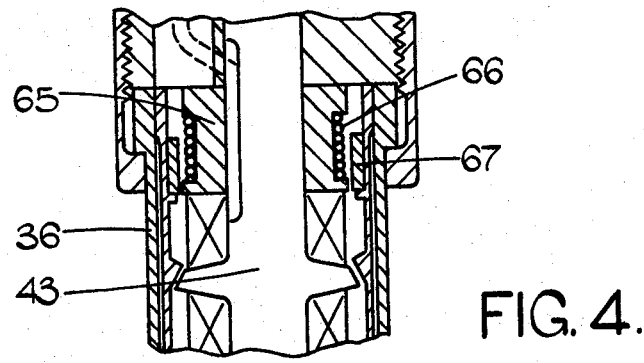
FIG. 4 is a diagrammatic view to an enlarged scale showing a modification of another part of the apparatus seen in FIG. 1.

In the example shown in FIG. 1 the transducer has a magnetisable core and a magnetisable sleeve movable with the armature. An alternative form of transducer is seen in FIG. 4 and in this case a non-magnetic former 65 is provided upon the outer peripheral surface of which is wound a single layer winding 66. Moreover, the armature 36 mounts a metal sleeve 67 which is formed from electrically conductive material which is non-magnetic for example, aluminium. The winding 66 is supplied in use with alternating current and the inductance of the winding is dependent upon the position of the sleeve 67 in which eddy currents are induced due to the current flow in the winding 66.

Other forms of transducer e.g. a capacitance type transducer may be provided.

We claim:

1. A fuel injection pumping apparatus for supplying fuel to a combustion space of an internal combustion engine and comprising an injection nozzle positioned in use on an engine so that fuel delivered to the nozzle will be injected into the combustion space and an injection pump for delivering fuel to the nozzle in timed relationship with the associated engine, the apparatus comprising an elongated hollow body of stepped form having the injection nozzle mounted at the narrower end of the body, a hollow cylindrical valve mounting having a peripheral flange engaging the step in the body and defining a bore in the body, a plunger forming part of said pump slidable in said bore to vary the size of a pumping chamber, resilient means biasing the plunger in a direction to increase the size of the pumping chamber, electromagnetic means mounted in the wider portion of the body and operable to move the plunger against the action of said resilient means to displace fuel from the pumping chamber through said nozzle, and a valve controlled fuel inlet to said pumping chamber and through which fuel can flow into said bore from a source of fuel when the plunger is moved by said resilient means, a valve member of said valve also acting to relieve the pressure in said bore by its engagement with the plunger, after the plunger has been moved to a predetermined position by the electromagnetic means, said bore being of stepped form, the end portion of the bore adjacent the electromagnetic means accommodating the plunger, the intermediate portion of the bore supporting the valve member and the other end portion of the bore defining at its end a seating for a head of the valve member, said other end portion of the bore being of larger diameter than the intermediate portion and having ports formed therein through which fuel can flow from said source, the valve member having a passage extending therethrough and through which fuel can flow into the pumping chamber from said ports when the valve head is lifted from its seating.

2. An apparatus according to claim 1 in which said ports communicate with the interior of the wider portion of the body by way of grooves defined between the wall of the narrower portion of the body and said valve mounting.

3. An apparatus according to claim 2 including a coiled compression spring biasing said valve head into contact with said seating, said spring being positioned between the valve head and a cylindrical member located against a step defined in the narrower portion of the body.

4. An apparatus according to claim 3 in which said cylindrical member defines passage means through which fuel can flow to said nozzle.

5. An apparatus according to claim 1 in which said electromagnetic means includes a hollow armature guided for movement by the wall of the wider portion of the body, and having a base portion integral with said plunger.

6. An apparatus according to claim 5 in which the electromagnetic means includes a stator assembly located within the armature, said stator assembly being mounted on an end closure for the wider end of the body.

7. An apparatus according to claim 6 in which said end closure defines an inlet for fuel.

8. An apparatus according to claim 6 including a transducer for providing a signal indicative of the position of the armature.

9. An apparatus according to claim 8 in which said transducer includes a winding carried by the stator assembly and a co-operating part carried by the armature, the inductance of said winding varying in use, as the armature moves relative to the stator assembly.

10. An apparatus according to claim 1 in which said nozzle includes a nozzle head which defines a seating for a resiliently loaded valve member.

11. An apparatus according to claim 10 in which said nozzle head is retained on the body by a retaining nut.

12. An apparatus according to claim 10 in which said nozzle head is electron beam welded to the body.

* * * * *